Dec. 21, 1954 D. RICHMAN 2,697,744

TELEVISION FIELD-IDENTIFICATION SYSTEM

Filed Sept. 1, 1951 5 Sheets-Sheet 1

INVENTOR.
DONALD RICHMAN

BY Laurence B. Dodds

ATTORNEY

Dec. 21, 1954 D. RICHMAN 2,697,744

TELEVISION FIELD-IDENTIFICATION SYSTEM

Filed Sept. 1, 1951 5 Sheets-Sheet 2

*INVENTOR.*
DONALD RICHMAN
*BY* Laurence B. Dodds
ATTORNEY

INVENTOR.
DONALD RICHMAN
BY Laurence B. Dodds
ATTORNEY

INVENTOR.
DONALD RICHMAN
BY Laurence B. Dodds
ATTORNEY

INVENTOR.
DONALD RICHMAN
BY Laurence B. Dodds
ATTORNEY

United States Patent Office 2,697,744

Patented Dec. 21, 1954

2,697,744

TELEVISION FIELD-IDENTIFICATION SYSTEM

Donald Richman, Flushing, N. Y., assignor to Hazeltine Research, Inc., Chicago, Ill., a corporation of Illinois Application September 1, 1951, Serial No. 244,756

24 Claims. (Cl. 178—5.4)

*General*

Figure 1:
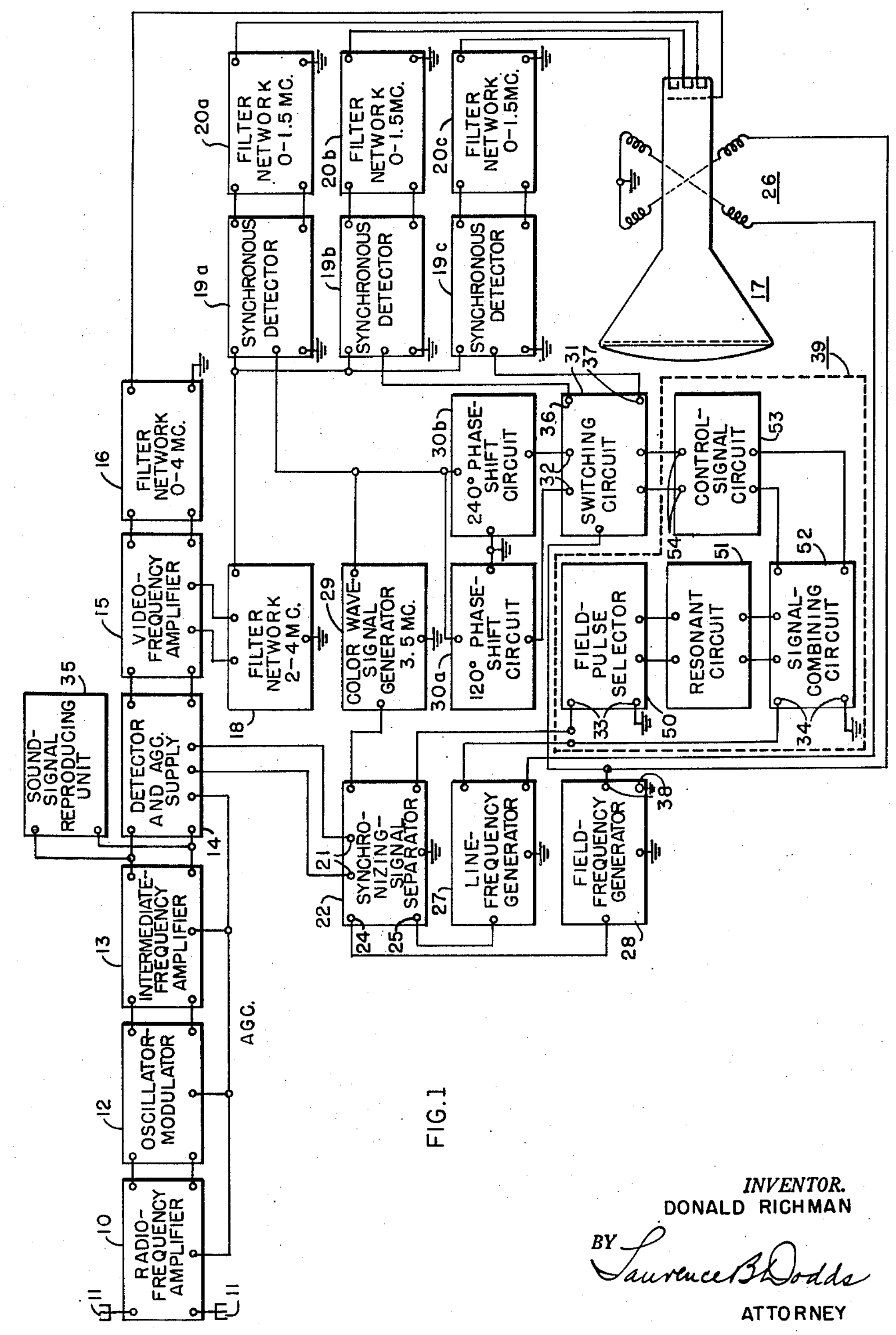

This invention relates to field-identification systems for conventional television systems of the odd-line interlaced type and particularly for color-television systems utilizing such interlacing, for determining whether a field being scanned is composed of odd or even lines of scan. Although the invention has application in such television systems, it is particularly useful in connection with color-television systems of the type described in copending application Serial No. 207,154, Bernard D. Loughlin, entitled "Color-Television System" and filed January 22, 1951, wherein the phase sequence in which color signals are derived in a color-television receiver is periodically changed. Accordingly, the invention will be described in that environment.

In a form of color-television system more completely described in the RCA Review for December 1949, Volume X, at pages 504–524, inclusive, and in an improved form of such system as described in the above-mentioned copending application, color signals individually representative of the basic colors, specifically green, red and blue of a color image being televised are developed at the transmitter. Components of these color signals are applied as modulation signals to a subcarrier wave signal effectively to modulate such signal in a predetermined phase sequence. The modulated subcarrier wave signal has a predetermined carrier frequency less than the highest video-frequency and has amplitude and phase characteristics related to the basic colors of the televised image. In a specific form of such system the subcarrier wave signal is effectively modulated at 120° phase intervals by successive ones of the three basic color-signal components. At any one time the green, red, and blue color-signal components may modulate the subcarrier in that phase sequence. At another time, as described in the above-mentioned copending application, for the purpose of minimizing the visual effects of cross talk caused by deriving the color-signal components at improper phase angles, the color-signal components may modulate the subcarrier wave signal in a different phase sequence. For example, the green, blue and red color-signal components may modulate the subcarrier wave signal in the order mentioned. In addition to the modulated subcarrier wave signal, a signal representative of the brightness of the image is also developed at the transmitter, combined in a common pass band with the modulated subcarrier wave signal, and the resultant signal is transmitted in a conventional manner.

The receiver in such a system intercepts the transmitted signal and derives therefrom the modulated subcarrier wave signal and the brightness signal. Modulation components of the subcarrier wave signal are detected by a deriving means which is designed to operate in synchronism and in proper phase relation with the subcarrier wave-signal modulating means at the transmitter. It is desired that the deriving means develop in its output circuit color-signal components which correspond in all their important characteristics with the components utilized to modulate the subcarrier wave signal at the transmitter. Furthermore, since several color signals modulate the subcarrier at different phase points thereon, it is particularly important that the deriving means at the receiver operate at the proper phase relationship with respect to a predetermined phase of the modulating means at the transmitter. The color-signal components derived at the receiver are combined with the brightness signal to reproduce on the image-reproducing device of the receiver a color image corresponding to the image being televised at the transmitter.

In a receiver which is part of the improved color-television system described in the copending application previously referred to, the phase sequence in which the color-signal components are derived is changed periodically in synchronism with a corresponding change at the transmitter. In one form of the improved color-television receiver, the color-signal components effectively are derived in the previously mentioned one phase sequence during one group of scanning fields or lines, for example, in the sequence green, red and blue. During another group of scanning fields or lines interlaced with the first mentioned group, these color-signal components are derived from the subcarrier wave signal in another phase sequence, for example, in the sequence green, blue, and red. Therefore, in order that the color-signal deriving means in the receiver be properly controlled to derive the color-signal components in the proper phase sequence, it is desirable to develop a control effect representative of the change from one sequence to another and of the sequence which should be employed at any given time. Since these sequence changes occur in relation to lines or fields being scanned, if the fields can be identified as odd-line or even-line fields, then a control effect may be developed which identifies such fields and the type lines therein, and that control effect can be utilized to assure that the proper phase sequence occurs during the initial portion of the identified field on proper lines. In this manner, if such synchronizing of the phase sequences at the transmitter and receiver occur on identified fields, then between such periods of identification the phase sequences may be changed at field or line frequency with some assurance that the color-signal deriving means in the receiver is operating in synchronism with the color-signal modulating means at the transmitter. Therefore, the present invention is directed to a field-identification system for identifying the fields in the one group and distinguishing them from the fields in the group interlaced therewith.

It is an object of the present invention, therefore, to provide a new and improved field-identification system which is relatively simple in construction and stable in operation.

It is another object of the present invention to provide a new and improved field-identification system for an odd-line interlaced television system for identifying the even-line fields with respect to the odd-line fields.

It is still another object of the present invention to provide a new and improved field-identification system for use in an odd-line interlaced television system which is capable of utilizing conventional television synchronizing pulses to effect the identification of the different fields.

It is still a further object of the present invention to provide for use in the improved type of color-television system described in the aforesaid copending application of Bernard D. Loughlin a new and improved field-identification system for developing a control effect to synchronize the phase sequence in which the receiver color-signal deriving means derives color signals with that phase sequence in which those color signals modulate a subcarrier wave signal at the transmitter.

In accordance with a particular form of the present invention, a field-identification system in an odd-line interlaced television system comprises a circuit for supplying a composite television signal including line-frequency pulses and groups of field-frequency pulses. These groups of field-frequency pulses have one time relationship with respect to the line-frequency pulses during one group of fields and another time relationship during fields interlaced therewith. The field-identification system also comprises a signal-generating apparatus coupled to the supply circuit and including circuit elements so proportioned as to develop a signal substantially in coincidence with each of the groups of field-frequency pulses and having a peak amplitude with a duration less than the interval between adjacent ones of said line-frequency pulses and at a time in the vicinity of a line-frequency pulse of one of these fields. The field-identification system also comprises means coupled to the supply circuit for developing pulse signals substantially synchronous with the line-frequency pulses and a control system jointly responsive to the developed pulse signals and the developed coincidence signal for developing a control effect representative of the time relation of the above-mentioned line-frequency pulses and groups of field-frequency pulses, thereby to identify each field.

For a better understanding of the present invention, together with other and further objects thereof, reference is had to the following description taken in connection with the accompanying drawings, and its scope will be pointed out in the appended claims.

Figure 2:
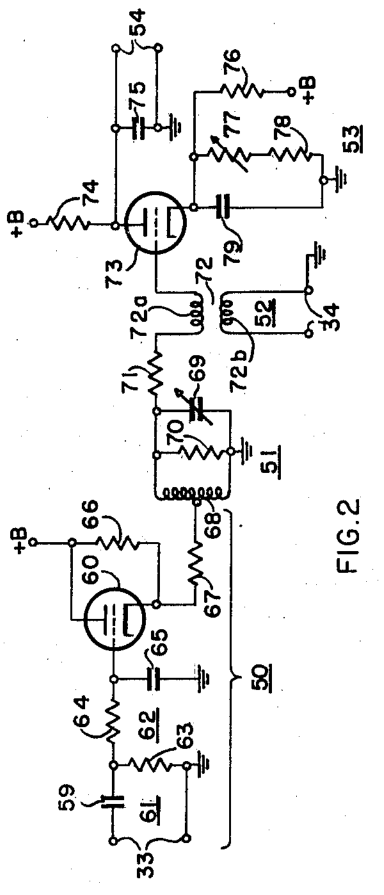
Figure 2A:
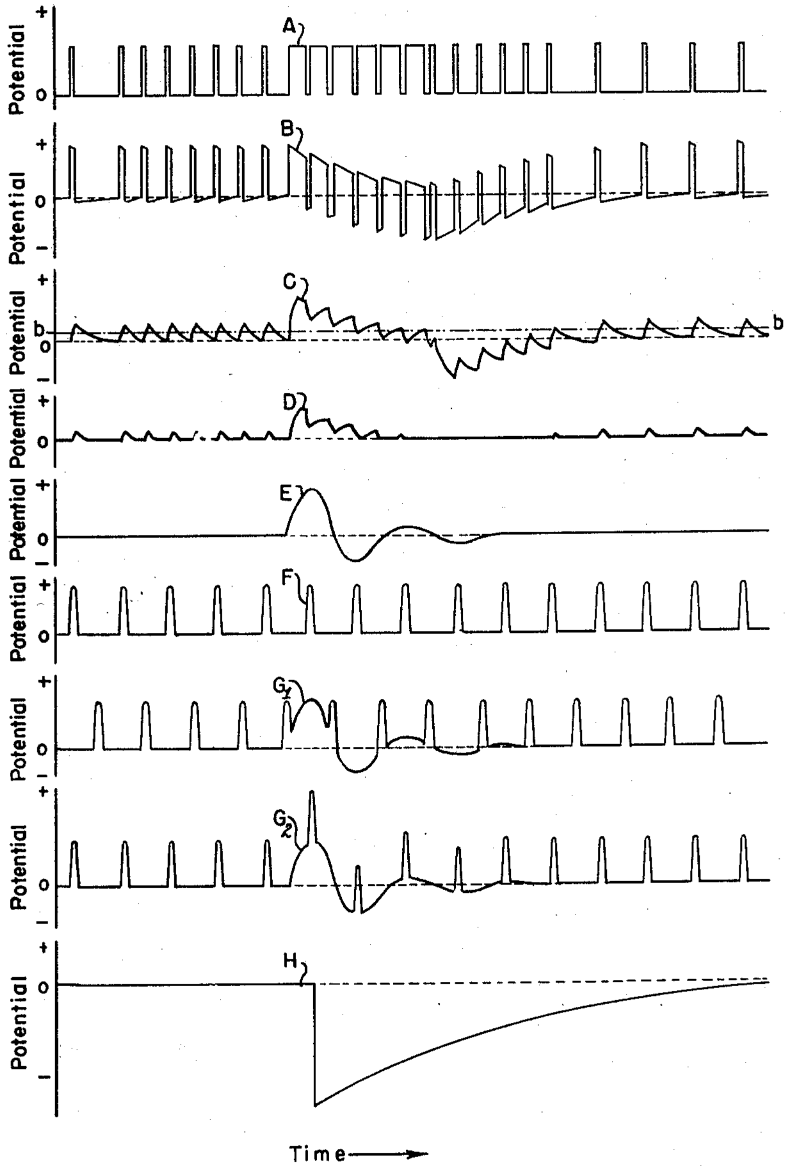

In the drawings Fig. 1 is a schematic diagram representing a color-television receiver embodying a field-identification system in accordance with one form of the invention; Fig. 2 is a circuit diagram of one form of the field-identification system of Fig. 1; Figs. 3, 4, 5 and 6 represent portions of the receiver of Fig. 1 including modified forms of the field-identification system; and Figs. 2*a*, 5*a*, and 6*a* are graphs utilized in explaining the operation of the modifications of Figs. 2, 5 and 6 respectively.

*General description of Fig. 1*

Referring now to Fig. 1 of the drawings there is represented a color-television receiver of the type employed in an odd-line interlaced television system and particularly of the type employed in the improved color-television system described in the copending application previously referred to herein. The receiver includes a radio-frequency amplifier 10 of one or more stages having an input circuit coupled to an antenna system 11, 11. Coupled in cascade with the output circuit of the amplifier 10, in the order named, are an oscillator-modulator 12, an intermediate-frequency amplifier 13 of one or more stages, a detector and automatic-gain-control (AGC) supply 14, a video-frequency amplifier 15 of one or more stages, and a 0–4 megacycle filter network 16. The output circuit of the network 16 is coupled to an intensity-control electrode of a cathode-ray tube in an image-reproducing device 17. The cathode-ray tube in the image-reproducing device 17 may, for example, comprise a single tube having separate cathodes individually responsive to different color signals and an arrangement for directing the beams emitted from the separate cathodes on to suitable color phosphors. The latter type of tube is more fully described in an article entitled "General Description of Receivers for the Dot-Sequential Color Television System Which Employ Direct-View Tri-Color Kinescopes" in the RCA Review for June 1950 at pages 228–232, inclusive. It will be understood that other suitable types of color image-reproducing devices may be employed.

An output circuit of the video-frequency amplifier 15 is coupled to each of the cathodes of the cathode-ray tube in the device 17 through a 2–4 megacycle filter network 18 having an output circuit coupled through each of a plurality of groups of series-connected synchronous detectors and 0–1.5 filter networks. The synchronous detectors are designated **19*a*, 19*b* and 19*c* while the filter networks are designated 20*a*, 20*b* and 20*c*, the units 19*a*–19*c*, inclusive, comprising a detector arrangement responsive to a modulated subcarrier wave signal for deriving color signals therefrom. In addition there is coupled to an output circuit of the detector 14, through a pair of terminals 21, 21, a synchronizing-signal separator 22 having output terminals 24 and 25 connected to line-scanning and field-scanning windings 26 in the device 17 through a line-frequency generator 27 and a field-frequency generator 28, respectively, the unit 28 having output terminals 38, 38. Another output circuit of the separator 22 is coupled to a color wave-signal generator 29 for generating, for example, a 3.5 megacycle sine wave, the output circuit of which is coupled directly to an input circuit of the detector 19*a* and through phase-shift circuits 30*a* and 30*b*, terminals 32, 32 and switching circuit 31 having output terminals 36 and 37 to input circuits of the detectors 19*b* and 19*c*, respectively. The phase-shift circuits 30*a* and 30*b* are proportioned to shift the phase of the signal applied thereto by 120° and 240°, respectively. The switching circuit 31 is arranged, as described in the above-identified copending application, periodically to couple the units 30*a* and 30*b* to different ones of the detectors 19*b* and 19*c*** and comprises means responsive to a control effect applied thereto for controlling the detector arrangement to cause it to derive the color-signal components in phase sequences corresponding to those being developed at the transmitter.

An output circuit of the synchronizing-signal separator 22 is coupled to a pair of input terminals 33, 33 of a field-identification system 39 to be described more fully hereinafter, and an output circuit of the line-frequency generator 27 is coupled to another pair of input terminals 34, 34 of the system 39. Another output circuit of the AGC supply 14 is connected to the input circuits of one or more of the tubes of the radio-frequency amplifier 10, the oscillator-modulator 12 and the intermediate-frequency amplifier 13, in a well-known manner, to maintain the signal input to the detector 14 within a relatively narrow range for a wide range of received signal intensities. A sound-signal reproducing unit 35 is also connected to the output circuit of the intermediate-frequency amplifier 13 and may have stages of intermediate-frequency amplification, a sound-signal detector, stages of audio-frequency amplification and a sound-reproducing device.

It will be understood that the various units thus far described, with the exception of the field-identification system 39, may be of any conventional construction and design. The details of such units are well-known in the art or are fully described in the copending application previously referred to, rendering a further description thereof unnecessary.

*General operation of receiver of Fig. 1*

In considering briefly the operation of the receiver of Fig. 1 as a whole, it will be assumed for the moment that the field-identification system 39 is a system for controlling the operation of the switching circuit 31 to effect proper coupling of the units **30*a* and 30*b* to the detectors 19*b* and 19*c* at the appropriate times in a manner to be described more fully hereinafter. A desired modulated television wave signal including color information is intercepted by the antenna system 11, 11. The signal is selected and amplified in the radio-frequency amplifier 10 and applied to the oscillator-modulator 12 wherein it is converted into an intermediate-frequency signal. The latter signal is then selectively amplified in the unit 13 and supplied to the detector 14 wherein its modulation components are derived. These modulation components are translated through the amplifier 15 and include a 0–4 megacycle brightness component which is translated through the filter network 16 and applied to the intensity-control electrode of the cathode-ray tube in the device 17 and also include a 3.5 megacycle modulated subcarrier wave signal which is translated through the filter network 18 and applied to an input circuit of each of the synchronous detectors 19*a*–19*c***, inclusive.

The synchronizing-signal components are separated from the video-frequency components in the separator 22 and are used to synchronize the operation of the line-frequency and field-frequency generators 27 and 28. These generators supply signals of saw-tooth wave form which are properly synchronized with reference to the transmitted television signal and are applied to the windings 26, thereby to effect a scanning of the target screen in the cathode-ray tube in a sequence of lines by deflecting the cathode-ray beam thereof in two directions normal to each other. The synchronizing-signal components also include a signal for synchronizing the 3.5 megacycle sine-wave generator 29 with the 3.5 megacycle subcarrier wave signal developed at the transmitter. The synchronous sine-wave signal is then applied directly to an input circuit of the detector **19*a* and through the phase-shifting circuit 30*a* and 30*b* and the switching circuit 31 to input circuits of the detectors 19*b* and 19*c*. The detectors 19*a*—19*c*, inclusive, as more fully described in the copending application previously referred to, derive the modulation components at the 0°, 120° and 240° phase points of the subcarrier wave signal, which components represent the color information. These components are individually translated through the networks 20*a*—20*c*, inclusive, and individually applied to the cathodes in the cathode-ray tube of the device 17**. These color-signal components on the cathodes of the tube and the brightness signal on the control grid thereof modulate the intensity of the electron beams emitted from the different cathodes in accordance with the amplitude variations of the applied signals to reproduce the color image being televised at the transmitter.

As more fully described in the copending application previously referred to, the switching circuit 31, under the control of a control effect developed in the field-identification system 39, in a manner to be described more fully hereinafter, selectively couples the units 30*a* and 30*b* to different ones of the detectors 19*b* and 19*c* on each scanning line or field, for example, so that the detectors 19*a*—19*c*, inclusive, derive the modulation components of the applied subcarrier wave signal in the phase sequence 0°, 120° and 240° during one line or field and in the phase sequence 0°, 240° and 120° during the next line or field. By such operation, as explained in the copending application, misphasing between the color-signal deriving means at the receiver and the color-signal modulation means at the transmitter is compensated for over a reasonable range of misphasing.

The automatic-gain-control or (AGC) signal derived in the unit 14 is effective to control the amplification of one or more of the units 10, 12 and 13 to maintain the signal input to the detector 14 and to the sound-signal reproducing unit 35 within a relatively narrow range for a wide range of received signal intensities. The sound-signal modulated wave signal, having been selected by the unit 10, converted to an intermediate frequency in the unit 12 and translated through the unit 13, is applied to the unit 35. Therein it is amplified and detected to derive the sound-signal modulation components which may be further amplified and then reproduced in the reproducing device of the unit 35.

*Description of field-identification system of Fig. 1*

Referring now in particular to the field-identification system 39 of Fig. 1, this system comprises a circuit for supplying a composite television signal including line-frequency pulses and groups of field-frequency pulses, the groups of field-frequency pulses having one time relation with respect to the line-frequency pulses during one group of fields and another time relation during fields interlaced therewith. More specifically, the supply circuit just mentioned includes the terminals 33, 33 and an input circuit of a field-pulse selector 50 coupled thereto.

The field-identification system also includes a signal-generating apparatus coupled to the supply circuit including the terminals 33, 33 and including circuit elements so proportioned as to develop a signal substantially in coincidence with each group of field-frequency pulses and having a peak amplitude with a duration less than the interval between adjacent ones of said line-frequency pulses and at a time in the vicinity of a line-frequency pulse of one of these fields. More specifically, the signal-generating apparatus includes a signal-selector device, specifically, the field-pulse selector 50 for selecting signals representative of the field-frequency pulses and for translating the selected signals. The signal-generating apparatus also includes a tuned circuit, specifically, a resonant circuit 51 coupled to the signal-selector device 50 and having a resonant frequency corresponding substantially to one-half the frequency of the line-frequency pulses for excitation by the selected signals to develop an output signal.

The field-identification system also includes means coupled to the supply circuit including the terminals 33, 33 for supplying pulse signals substantially synchronous with the line-frequency pulses. More specifically, the latter means comprises an input circuit of a signal-combining circuit 52 having terminals 34, 34 which are coupled to the line-frequency generator 27.

In addition, the field-identification system includes a control system jointly responsive to the developed line-frequency pulse signals and the developed coincidence signal for developing a control effect representative of the time relation of the line-frequency pulses and the groups of field-frequency pulses, thereby to identify each field. This control system includes the signal-combining circuit 52 coupled to the resonant circuit 51, the circuit being jointly responsive to the developed pulse signals applied to the terminals 34, 34 and the developed coincidence signal applied from the unit 51 for combining these signals to develop resultant signals. The control system also includes a control-signal circuit 53 coupled to the output circuit of the unit 52 and through terminals 54, 54 to the switching circuit 31. This control circuit is effective to derive from the resultant signals the above-mentioned control effect.

*Explanation of operation of field-identification system 39 of Fig. 1*

The operation of the field-identification system 39 of Fig. 1 will now be explained briefly, a more complete explanation being presented subsequently with respect to the particular embodiment of Fig. 2. A composite television synchronizing signal including both field-frequency and line-frequency pulses is applied through the terminals 33, 33 to the field-pulse selector 50. In accordance with the Federal Communications Commission's Standards for commercial television broadcasting, the applied field-frequency pulses have one time relation with respect to the applied line-frequency pulses during one group of fields and another time relation during interlaced fields. This relationship is maintained in order that the odd-line interlaced system may be utilized, that is, that during one field the initial line will start in the upper left hand corner of the raster being traced, while on the next field the line will start in the upper portion of the field, interlaced between the previously traced lines, at a position one-half way between the sides of the raster. The field-pulse selector 50 effectively separate a signal representative of each group of field frequency pulses from line-frequency pulse signals and applies this selected signal to the resonant circuit 51.

The resonant circuit 51 resonates at a frequency of substantially one-half the frequency of the line-frequency pulses. It therefore develops a signal which is substantially in coincidence with the field-frequency pulse signal which excites the resonant circuit, and the developed signal has a peak amplitude with a duration less than the interval between adjacent ones of said line-frequency pulses and approximately in coincidence with a line-frequency pulse in one of the fields. Because of the relationship of the line-frequency pulses to the field-frequency pulses during the fields interlaced with the aforesaid one field, this peak amplitude is not in coincidence with a line-frequency pulse during the interlaced fields. The signal developed in the circuit 51 is then applied to the signal-combining circuit 52 wherein it combines with the line-frequency pulses developed during line retrace intervals and which are applied through the terminals 34, 34, thereby to develop a resultant signal. During one group of fields the signals developed in the resonant circuit 51 will have line-frequency pulses superimposed on the peaks thereof but during another group of fields interlaced with the first group there will be no line-frequency pulses superimposed on the peaks of these signals, the pulses occurring along the axis of the resonant signal at cross-over points of the latter signal.

The resultant signal developed in the combining circuit 52 is than applied to a control-signal circuit 53 wherein an operation such as peak detection develops a control effect during the initial portion of the one field in which a line pulse is superimposed on the resonant signal. However, no control effect is developed during the interlaced fields. This control effect is then applied through the terminals 54, 54 to the switching circuit 31 to determine the condition of operation of the circuit 31 so that the signals derived in the detectors 19*a*—19*c*, inclusive, will be derived in phase sequences synchronous with the phase sequences being employed in the color-signal modulator at the transmitter.

*Description of field-identification system of Fig. 2*

Fig. 2 represents a particular embodiment of the unit 39 of Fig. 1 and, therefore, circuits of Fig. 2 which are representative of the units 50–53, inclusive, of Fig. 1 are so designated. The field-pulse selector 50 comprises a cathode-follower amplifier including a tube 60, the control electrode of which is coupled to the terminals 33, 33 through the series combination of a differentiating circuit 61 including a condenser 59 and a resistor 63 and an integrating circuit 62 including a resistor 64 and a condenser 65. The differentiating circuit 61 is proportioned to have a long time constant with respect to the duration of a line-frequency pulse, the time constant of the circuit 61 being, for example, approximately twenty-five times that of the duration of a line-frequency pulse. The integration circuit 62 has a relatively short time constant, for example, approximately three times the duration of a line-frequency pulse. The anode of the tube 60 is coupled to a source of potential +B, and a voltage divider comprising a resistor 66, a resistor 67, and a portion of an inductor 68 is coupled across the source of potential +B, the junction of the resistors 66 and 67 being connected to the cathode of the tube 60 to effect a positive bias thereon.

The resonant circuit 51 includes the inductor 68 which has a variable condenser 69 and a damping resistor 70 coupled in parallel therewith. The circuit 51 is coupled through a filtering resistor 71 to a secondary winding **72*a* of a transformer 72, the primary winding 72*b* of which is coupled to the terminals 34, 34. The transformer 72 coupled to the resonant circuit 51 and to the control-signal circuit 53 comprises the signal-combining circuit 52**.

The control-signal circuit includes a peak detector comprising a tube 73, the control electrode of which is connected to the transformer winding **72*a*. The anode of the tube 73 is connected through a resistor 74 to a source of potential +B and to one of the terminals 54, 54, the terminals having a condenser 75 coupled thereacross. A voltage divider including series-connected resistors 76, 77 and 78, the resistor 77 being variable, is connected across the source of potential +B, the junction of the resistors 76 and 77 being connected to the cathode of the tube 73. A by-pass condenser 79 is coupled across the resistors 77 and 78**.

*Explanation of operation of field-identification system of Fig. 2*

Considering now the operation of the field-identification system of Fig. 2, and referring to curves A–H, inclusive, of Fig. 2*a* each curve representing the wave form of a signal associated with a specific point in the circuit of Fig. 2, the composite television synchronizing signal including the line-frequency and field-frequency pulses, as represented by curve A, is applied to the terminals 33, 33 from a unit such as the signal separator 22 of Fig. 1. The differentiating circuit 61, because of its relatively long time constant with respect to the duration of a line-frequency pulse, effects very little differentiation of the last-mentioned pulses but does differentiate the field-frequency pulses, producing an output signal represented by curve B. The signal having the wave form of curve B is then partially integrated in the circuit 62 to produce a signal having the wave form of curve C, the latter signal being applied to the control electrode of the tube 60. The integration circuit 62, which has a short time constant with respect to the duration of a single field-frequency pulse, is effective partially to integrate the line-frequency pulses, thereby reducing their amplitude, but has relatively little effect on the amplitude of a group of field-frequency pulses, modifying primarily the slopes of the leading and trailing edges thereof. As a result, at least a portion of each group of field-frequency pulses has an amplitude exceeding that of the line-frequency pulses in the vicinity thereof. The voltage divider including the resistors 66 and 67 develops a positive bias potential on the cathode of the tube 60 as represented by the level *b*—*b* of curve C, thereby causing this tube to be conductive only during that portion of the wave represented by curve C having an amplitude in excess of such bias potential to develop in the cathode circuit of the tube 60 a signal having the wave form represented by curve D. The latter signal, in particular the high-amplitude portion thereof, is effective to shock-excite the damped resonant circuit 51 sufficiently to develop an output signal having the wave form represented by curve E.

Pulse signals having the wave form represented by curve F and being substantially synchronous with the line-frequency pulses, for example, being line retrace pulses, are applied through the terminals 34, 34 to the primary winding **72*b* of the transformer 72 and inductively to the secondary winding 72*a* thereof. The winding 72*a* is effective to combine the signal developed in the resonant circuit 51 with the pulses applied through the terminals 34, 34 to develop signals having the wave form represented by the curve $G_1$ during one group of fields and the wave form represented by the curve $G_2$ during fields interlaced with the one group of fields. It is seen that because the circuit 51 has a frequency of substantially one-half the line frequency, the fact that the circuit 51 is shock-excited by a signal substantially in coincidence with a field-frequency pulse, and due to the conventional relationships of the line-frequency pulses and field-frequency pulses, during the one group of fields the line-frequency pulses will occur at the axis of the damped signal developed in the resonant circuit 51 as represented in curve $G_1$, and during fields interlaced with the one group of fields the line-frequency pulses will occur with at least one thereof superimposed on a peak amplitude portion of the signal developed in the circuit 51 as represented in curve $G_2$. The circuit 51** is therefore effective to identify the field in which the superimposed line pulses occur and, hence, to identify the field composed of the even lines from the field composed of the odd lines.

The signals represented by the curves $G_1$ and $G_2$ are applied to the control electrode of the tube 73. The circuit including this tube is effectively a peak detector circuit having a cathode bias adjustable by means of the resistor 77 and having some integration effects due to the condensers 79 and 75. The bias is such that only a peak portion of the superimposed pulse of curve $G_2$ exceeds this bias and develops a pulse represented by curve H in the anode circuit of the tube. This will occur during the initial portion of the field in which a line-frequency pulse is superimposed, as represented by curve $G_2$. During that field having the line-frequency pulses occurring in such time relation with respect to the field-frequency pulses as to cause the signal represented by curve $G_1$ to be developed, the bias on the cathode of the tube 73 will not be exceeded and an output pulse will not be developed in the anode circuit of the tube. Therefore, it is seen that on one field a pulse having a wave form as represented by curve H is developed and is effective to control the switching circuit 31 of Fig. 1, whereas on another field no pulse is developed, and, therefore, no control is effected on the switching circuit 31. Since the existence or nonexistence of a developed pulse identifies whether the field is one in which even lines or odd lines occur, the system is effectively a field-identification system.

While applicant does not intend to limit the invention to any specific circuit constants, the following circuit constants are given as illustrative of one embodiment of the invention constructed in accordance with the arrangement of Fig. 2.

| | |
|---|---|
| Resistors **63** and **64** | 0.5 megohm |
| Resistor **66** | 27 kilohms |
| Resistor **67** | 680 ohms |
| Resistor **70** | 390 kilohms |
| Resistor **71** | 100 kilohms |
| Resistor **74** | 450 kilohms |
| Resistor **76** | 470 kilohms |
| Resistor **77** | 250 kilohms (max.) |
| Resistor **78** | 10 kilohms |
| Condenser **59** | 250 micromicrofarads |
| Condenser **65** | 30 micromicrofarads |
| Condenser **69** | 400 micromicrofarads |
| Condenser **79** | 0.22 micromicrofarad |
| Condenser **75** | 500 micromicrofarads |
| Inductor **68** | 1000 turn 1 henry inductor with a tap at 50 turns, wound on a #7 Hypersil core. |
| Tube **60** | ½ Type 12AT7 |
| Tube **73** | ½ Type 12AT7 |
| +B | 100 volts |
| Amplitude of pulses applied to terminals **33, 33**. | 12–15 volts |
| Amplitude of pulses applied to terminals **34, 34**. | 10–15 volts |

Figure 3:
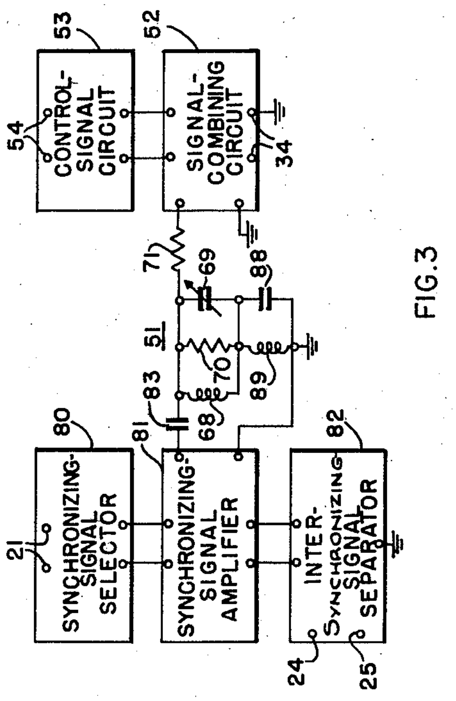

*Description and explanation of operation of embodiment of Fig. 3*

In some installations, for purposes of economy of cost and space it may be desirable to use the modified form of field-identification system which comprises a portion of the receiver circuit represented by Fig. 3. Essentially, except for the elimination of some circuits, the arrangement of Fig. 3 is similar to an arrangement of corresponding units in Fig. 1, and like units, therefore, are designated by the same reference characters.

The synchronizing-signal separator 22 of Fig. 1 is represented in more detail in Fig. 3 as the series combination of a synchronizing-signal selector 80, a synchronizing-signal amplifier 81, and an intersynchronizing-signal separator 82. An output circuit of the amplifier 81 is coupled through a coupling condenser 83 to the tuned circuit 51. The coupling of the unit 81 directly to the tuned circuit 51 eliminates the need for a field-pulse selector 50 as represented in Fig. 1. The circuit 51 is a multi-resonant circuit including a portion 68, 69 parallel resonant at half line frequency, and also includes a portion comprising primarily the condenser 69 and an inductor 89 which are series resonant at line frequency and further comprising a condenser 88 in parallel with the inductor 89 for by-passing the higher harmonics of the line-frequency pulses. Elements 88 and 89 have a parallel resonance such as one and one-half times the frequency of the line-synchronizing pulses.

Considering now the operation of the embodiment of Fig. 3, conventional line-frequency and field-frequency pulses are amplified in the unit 81 and applied through the coupling condenser 83 to the multi-resonant circuit 51. The circuit 51 presents a very low impedance to line-frequency pulses so that they are not effectively translated to the signal-combining circuit 52. The field-frequency pulses, however, shock-excite the tuned circuit 51 into at least a few cycles of oscillation at half line frequency developing a large amplitude signal. This signal is then combined in the circuit 52 with the line-frequency pulses from the terminals 34, 34 in the manner previously described with reference to Fig. 2 and a control effect is derived in the unit 53 from the combined signal.

Figure 4:
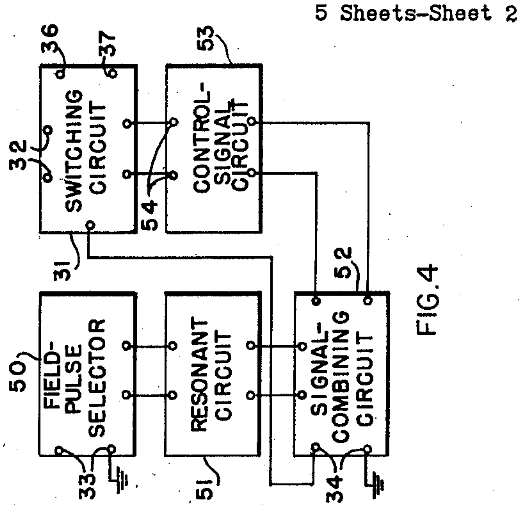

*Description and explanation of operation of the embodiment of Fig. 4*

There has been described herein with reference to Fig. 1 a circuit arrangement for utilizing the field-identification system in accordance with the present invention to effect a change in the phase sequence in which the color-modulation signals are derived on each field. As has previously been mentioned, it may be desirable to effect this change in phase sequence on each line. The arrangement represented in Fig. 4 may be employed for this purpose. The units represented in Fig. 4 are similar to the corresponding units of Fig. 1, and, therefore, like units have been designated by the same reference characters. In the Fig. 4 arrangement, however, the switching circuit 31 has one input circuit coupled to a unit such as the line-frequency generator 27 of Fig. 1 through the terminals 34, 34 rather than having this input circuit coupled to terminal 38 of a unit such as the field-frequency generator 28 of Fig. 1.

Considering now the operation of the Fig. 4 embodiment, the units 50, 51, 52 and 53 operate in substantially the same manner as the corresponding units of Fig. 1 to develop a control effect to control the operation of the switching circuit 31. The switching circuit 31, which may include a device which is stable in either of two operating conditions, is changed from one operating condition to the other by an application of a triggering pulse either from the output circuit of the control-signal circuit 53 or from the terminals 34, 34 or both. Although in Fig. 1 the switching circuit 31 was triggered to change from one operating condition to another at the beginning of each field, the switching circuit 31 of Fig. 4 is triggered to change from one operating condition to another at the beginning of each line by the application of a line-frequency pulse thereto from the terminals 34, 34. The control effect derived in unit 53 assures that the proper operating conditions effecting the proper phase sequence of derivation of the color signals are determined. A more complete explanation of this determination will be presented with respect to the embodiment of Fig. 6.

Figure 5:
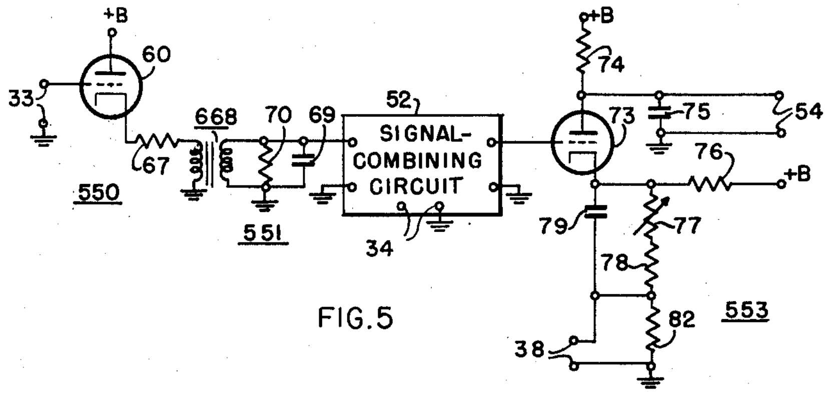
Figure 5A:
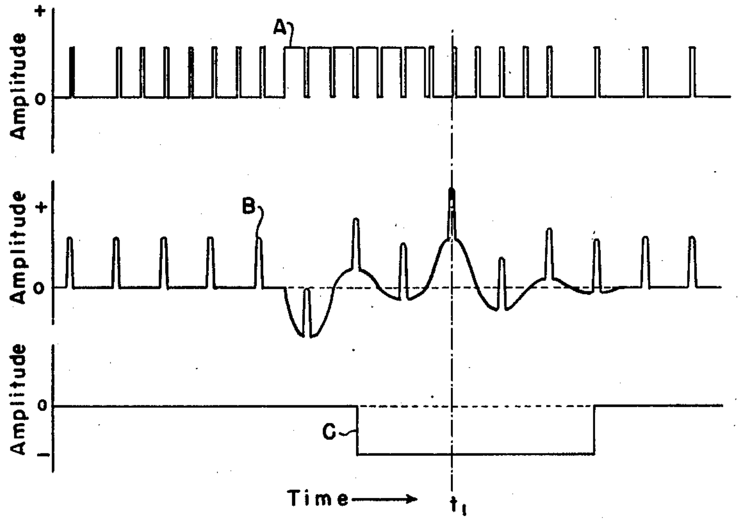

*Description and explanation of operation of the embodiment of Fig. 5*

In order to minimize the effects of random noise in shock-exciting the resonant circuit, it may be desirable to effect a keying action in the system to assure that the excited resonant circuit may be effective for the purposes of the present invention only during that period when field-frequency pulses are present. For such purpose the embodiment of Fig. 5 is desirable. This embodiment is similar to corresponding portions of the units of Figs. 1 and 2 except for the field-pulse selector 50 and the control-signal circuit 53. Accordingly, like components thereof are designated by the same reference numerals, while analogous components are designated by the same reference numerals with a factor of 500 added thereto.

In the embodiment of Fig. 5 the field-pulse selector 550 does not include the integration and differentiation circuits of the selector 50 of Fig. 2, and self-biasing of the cathode of the tube 60 is effected by the resistor 67. Also, in the control-signal circuit 553, the junction of the condenser 79 and the resistor 78 is coupled to ground through a resistor 82, the latter resistor being coupled through the terminals 38, 38 to form a load circuit for a unit such as the field-frequency generator 28 of Fig. 1, specifically to a portion of the generator 28 which develops a negative polarity pulse during the retrace interval. The variable resistor 77 is proportioned positively to bias the cathode of the tube 73 with respect to the control electrode thereof so that the control electrode is not driven sufficiently positive by signals applied to that electrode alone to effect conduction in the tube 73. The resonant circuit 551 is inductively coupled to the cathode of the tube 60 through a transformer 668.

Considering now the operation of the embodiment of Fig. 5 and referring to the wave forms represented by curves A–C, inclusive, of Fig. 5*a*, a conventional composite synchronizing signal, as represented by curve A, and having line-frequency and field-frequency pulses, is applied to the control electrode of the tube 60 through the terminals 33, 33. The pulses represented by curve A are translated through the tube 60 and, after phase reversal in the transformer 668, each group of field-frequency pulses shock-excites the resonant circuit 551. Since the line-frequency pulses have a relatively low energy content and occur at twice the resonant frequency of the circuit 551, they do not effectively influence that resonant circuit. The signal developed in the circuit 551 combines in the unit 52 with the pulse signals synchronous with the line-frequency pulses applied thereto through the terminals 34, 34 to develop, during the initial portion of one field, a signal as represented by curve B. With respect to the sine-wave portion of the signal represented by curve B, it should be noted that not only does the leading edge of the field-frequency pulses cause the first negative-going portion of the sine-wave signal to be developed by shock excitation but the trailing edge of the same field-frequency pulse occurring in proper timing with a positive-going portion of the sine-wave signal increases the energy in the resonant circuit at this time to increase the amplitude of the positive peak of the sine-wave signal. Such effects are conventionally developed by shock excitation of a resonant circuit. The signal represented by curve B is applied to the control electrode of the tube 73 but, because of the large positive bias on the cathode of the tube 73, is ineffective alone to cause the tube 73 to conduct even at time $t_1$ when the applied signal has the maximum amplitude. At some time during the occurrence of a group of field-synchronizing pulses as represented by the curve A and the sine wave as represented by the curve B, a conventional field-retrace pulse as represented by curve C is developed in the field-frequency generator. This pulse is present in an output circuit of a unit such as the generator 28 of Fig. 1 and is applied through the terminals 38, 38 to the resistor 82 in the cathode circuit of the tube 73. This pulse reduces the positive bias on the cathode and causes the tube to conduct at time $t_1$ when the signals on the control electrode of the tube 73 then exceed the cathode cutoff bias because of the effect of the pulse represented by curve C on that bias. By keying the control-signal circuit 553 with a pulse signal synchronous with the groups of field-frequency pulses developed in the receiver, the resonant circuit 551 will not be effective to develop a control effect except when a field-frequency retrace pulse as represented by curve C is generated in the receiver. Thus the field-identification system becomes substantially immune to noise which otherwise would tend to cause the receiver to lose field synchronization.

Figure 6:
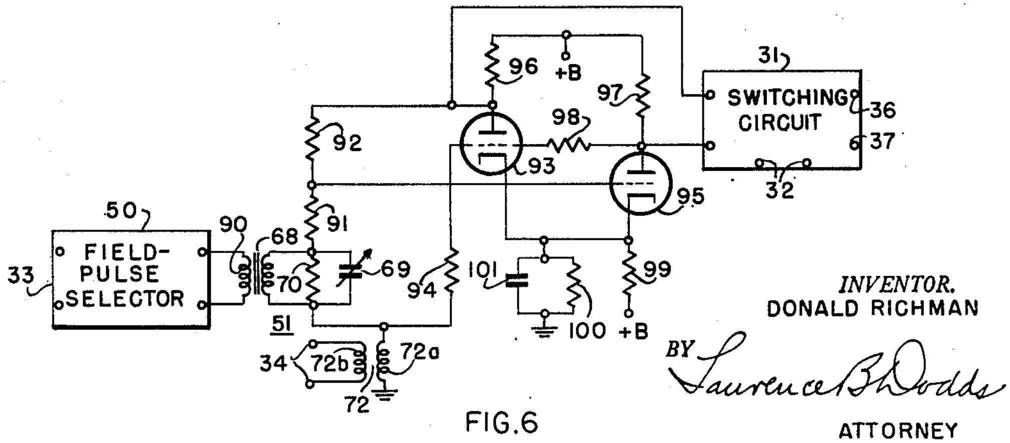
Figure 6A:
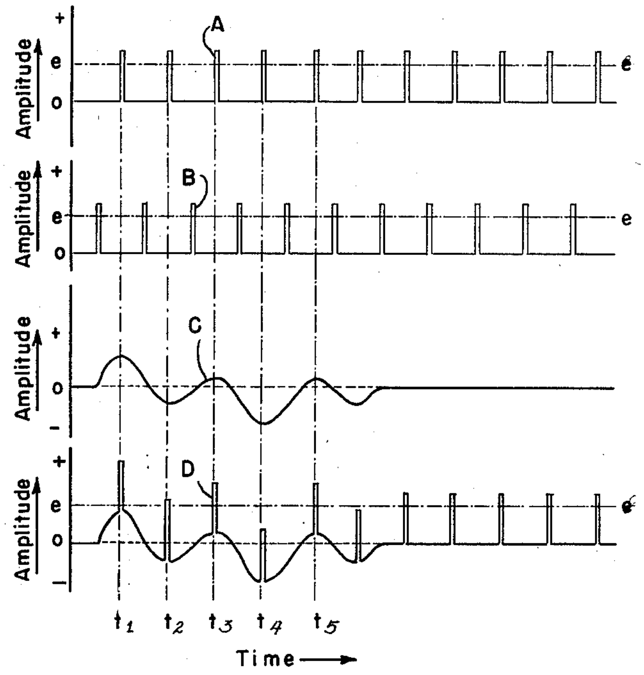

*Description and explanation of operation of embodiment of Fig. 6*

There has previously been described, with reference to Fig. 4, an embodiment of the present invention for use in a color-television receiver in which the phase sequence of the derivation of the color signals is changed at the beginning of every line of scan. The embodiment of Fig. 6 represents an improved and simplified modification of the embodiment of Fig. 4 wherein the signal-combining circuit 52 and the control-signal circuit 53 of the embodiment of Fig. 4 are combined into one circuit which may also be a portion of the switching circuit 31. Since, except for modifications, the embodiments of Figs. 2, 4 and 6 are similar, like units thereof are designated by the same reference numerals.

In the modified form represented by Fig. 6, the output circuit of the selector 50 is coupled through a winding 90 of the transformer 68 to the resonant circuit 51. One terminal of the resonant circuit 51 is coupled through resistors 91 and 92 to the anode of a tube 93 while the other terminal thereof is connected through a resistor 94 to the control electrode of that tube. The resistor 91 is of relatively high resistance in order to prevent the signals developed in a trigger circuit to be described subsequently from shock-exciting the resonant circuit 51. The junction of a terminal of the circuit 51 and the resistor 94 is coupled to ground through the secondary winding 72a of the transformer 72. The tube 93 and another tube 95 are coupled to form a conventional Eccles-Jordan form of triggered circuit having two stable operating conditions. The anodes of tubes 93 and 95 are coupled through resistors 96 and 97, respectively, to a source of potential +B and to input terminals of the switching circuit 31. The anode of the tube 95 is also coupled to the control electrode of the tube 93 through a resistor 98, while the control electrode of the tube 95 is coupled to the junction of the resistors 91 and 92. The cathodes of the tubes 93 and 95 are connected to the junction of resistors 99 and 100 which are connected in series across the source of potential +B. A by-pass condenser 101 is coupled across the resistor 100.

Considering now the operation of the embodiment of Fig. 6, as has been mentioned, the tubes 93 and 95 are coupled to form a trigger circuit which is stable in either of two operating conditions, that is, either the tube 93 or the tube 95 may conduct in a stable manner. It is characteristic of such a circuit that only one tube may conduct at any one time, effecting by such conduction a cutoff bias on the other tube, and that the other tube may be caused to conduct by the application of a triggering pulse thereto. These triggering pulses, having wave forms as represented by curves A and B of Fig. 6*a*, are line-frequency pulses or pulses synchronously related thereto and are applied through the terminals 34, 34 and the resistor 94 to the control electrode of the tube 93. The pulses of curve A occur during one group of fields while the pulses of curve B occur during fields interlaced with the one group. These pulses are also applied through the resonant circuit 51 and the resistor 91 to the control electrode of the tube 95. Assuming for the moment that the resonant circuit 51 is not excited by a signal from unit 50 and that tube 93 is conducting, the positive pulses applied through the resistor 94 to the control electrode of the tube 93 will have no effect on this tube since it is conducting. However, the pulse applied through the resonant circuit 51 and the resistor 91 to the control electrode of the tube 95 will immediately cause the tube 95 to start conducting, developing a potential at the anode thereof which is applied to the control electrode of the tube 93 through the resistor 98 and which causes the tube 93 to be driven to cutoff. Upon application of the next pulse, the reverse of this procedure will occur, tube 93 being initiated into conduction, and tube 95 being driven to cutoff. The operations of the tubes 93 and 95 cause control pulses to be developed in the anode circuits thereof. These pulses control the switching circuit 31 which in turn causes the phase-shift circuits described in connection with Fig. 1 to be coupled to different ones of the synchronous detectors during different switch conditions. The cathodes of the tubes 93 and 95 have such a positive bias that only pulses having an amplitude level exceeding the level *e—e*, as represented with respect to curves A, B and D of Fig. 6*a*, can be effective in triggering the tubes 93 and 95.

It will be understood that if only the line-frequency pulses are applied to control the operation of the tubes 93 and 95 and in turn to control the switching condition of the switching circuit 31, it is possible to have the switching operation at the receiver 180° out of phase with a corresponding operation at the transmitter and thus to have the receiver deriving the color signals in phase sequences which are 180° out of phase with corresponding phase sequences at the transmitter. Also, since there are an odd number of lines in each frame and it is desired that the color signals related to the first line in each frame be derived in the same phase sequence, some control should be effected prior to or during the first line of each frame to assure this result. Therefore, it is desirable to apply a control effect to the circuit including the tubes 93 and 95 so that they will be conditioned to operate in phase with a corresponding unit at the transmitter. It is understood that once the tubes are conditioned to operate in phase, because they are triggered from one condition to another by every line-frequency pulse, they will continue to remain in proper phase for a frame even when the phase sequences are changed on every line as long as only the line-frequency pulses are effective to control the condition of operation of the tubes 93 and 95 during this period. Thus it is only necessary to determine during a small portion of the complete operation period, that is, once each frame that these tubes are in the proper operating condition at the proper time.

The resonant circuit 51 is caused to resonate, as previously described, to develop a wave such as that represented by curve D of Fig. 6*a*. The amplitude of this wave is somewhat critical in that the maximum amplitude thereof should not exceed the bias potential represented by the level *e—e* in the tubes 93 and 95 in order that the resonant signal will not be effective alone to control the operation of the tubes 93 and 95. It will also be seen that the peak amplitudes of the signal represented by curve C occur in coincidence with some of the pulses which are represented in curve A and which are developed during a predetermined scanning field while none of the pulses represented by curve B, which are developed during a scanning field interlaced with the first scanning field, occur in coincidence with peak amplitudes of the signal represented in curve C. Therefore, during that initial portion of the field in which the pulses represented by curve A are developed, a signal as represented by curve D will be developed in the resonant circuit 51 for application to the control electrode of the tube 95 and resulting from the combination of the signal represented by curve C with the pulses represented in curve A. It will also be seen from curve D that the pulses occurring at times $t_1$, $t_2$, $t_3$ and $t_5$ exceed the bias level *e—e* and these pulses control the operation of the tube 95, while the pulse occurring at the time $t_4$ does not exceed that bias level and hence does not trigger the tube 95.

The manner in which the resonant signal developed in the circuit 51 is effective to determine the operation of the tubes 93 and 95, thereby to assure that the color signals are derived in proper phase sequences, will now be explained by first considering that the tubes are operating 180° out of the proper phase, and secondly by considering that the tubes are operating in proper phase. In the first situation just mentioned it will be assumed that the tube 95 should begin to conduct at the time $t_1$ and that the tube 93 should cease to conduct at this time. It will further be assumed that the tube 95, however, is conducting at time $t_1$. The tubes 93 and 95 are therefore operating 180° out of phase with respect to their proper mode of operation and the color signals are being derived in phase sequences which are 180° out of phase with respect to the proper phase sequences.

The pulse of curve D applied to the control electrode of the conducting tube 95 at the time $t_1$ does not alter the operating condition of that tube. However, the pulse of curve A applied at time $t_1$ to the control electrode of the nonconducting tube 93 overcomes the bias thereon and causes the tube to conduct. This in turn renders the tube 95 nonconductive at time $t_1$ in a well-known manner, this operation therefore occurring at a time when the opposite mode of operation should be taking place. The pulse of curve D applied to the control electrode of the tube 95 at time $t_2$ overcomes its bias and renders the tube 95 conductive and this in turn renders the tube 93 nonconductive. The pulse of curve D applied at time $t_3$ to the control electrode of tube 95 has no effect on its operating condition since the tube is conducting at that time. However, the pulse of curve A applied to the control electrode of the tube 93 at time $t_3$ renders it conductive, and this in turn causes the tube 95 to become nonconductive at time $t_3$. At time $t_4$ the amplitude of the pulse of curve D which is applied to the control electrode of the then nonconducting tube 95 does not exceed the critical level or bias thereon and, therefore, does not alter its operating condition. Also at time $t_4$ the pulse of curve A which is applied to the control electrode of the then conducting tube 93 does not alter its operating condition. Therefore, the tube 93 continues to conduct during an interval when it should be conducting and the tube 95 is nonconducting as it should be during the same interval. At time $t_5$ the pulse of curve D renders the tube 95 conductive and the tube 93 ceases to conduct.

Since the tubes 93 and 95 are now operating in the proper sequence, they will continue to do so unless upset by random noise pulses or other extraneous effects.

To summarize the explanation just presented, line-frequency pulses are applied directly to the control circuit of the tube 93 while being applied indirectly to the other tube 95 through the resonant circuit 51. Due to the circuit 51 being resonant at one-half line frequency, if the tubes are operating 180° out of the proper phase of operation, the first or second negative half cycle of the signal developed in the resonant circuit 51 will cause the deletion of one effective triggering pulse normally applied to the tube 95 and the triggered circuit will remain in the same condition for two lines of scan, thereby causing the tubes 93 and 95 to get into the proper phase of operation.

Consider now the second situation mentioned above when the tubes 93 and 95 are operating in the proper manner at time $t_1$. It is understood that this could occur only if at some time during the frame being scanned the system had been erroneously triggered because each frame has an odd number of lines, specifically 525 lines, and lines 1 and 526 would normally utilize color signals derived in different phase sequences. In other words, all the phase sequences on the even lines would be the same and those on the odd lines would be similar to each other but different from those on the even lines. That is, that the tube 93 is conducting when it should be conducting, and the tube 95 is caused to conduct at time $t_1$ when it should be caused to conduct. Accordingly, the pulse of curve D occurring at time $t_1$ when applied to the control electrode of the tube 95 causes the tube 95 to start to conduct, thereby causing the tube 93 to cease conducting. The pulse of curve D applied at time $t_2$ to the control electrode of the then conducting tube 95 has no effect on its operating condition. However, the pulse of curve A applied at time $t_2$ to the control electrode of the then nonconducting tube 93 overcomes the bias thereon and causes the tube to conduct and this in turn renders the tube 95 nonconductive. At time $t_3$ the pulse of curve D applied to the control electrode of the nonconductive tube 95 renders it conductive and this in turn causes the tube 93 to cease to conduct. At time $t_4$ the low-amplitude pulse of curve D applied to the control electrode of the then conducting tube 95 does not affect its operation. However, at time $t_4$ the pulse of curve A applied to the control electrode of the nonconducting tube 93 overcomes its bias and renders it conductive and in turn causes the tube 95 to cease to conduct. At time $t_5$ the pulse of curve D applied to the control electrode of the tube 95 overcomes its bias and renders it conductive and tube 93 becomes nonconductive. Thus, it is seen that if the tubes 93 and 95 are operating in the proper phase, the signal developed in the circuit 51 does not change the manner of operation of those tubes.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In an odd-line interlaced television system, a field-identification system comprising: a circuit for supplying a composite television signal including line-frequency pulses and groups of field-frequency pulses, said groups of field-frequency pulses having one time relation with respect to said line-frequency pulses during one group of fields and another time relation during interlaced fields; signal-generating apparatus coupled to said supply circuit and including circuit elements so proportioned as to develop a signal substantially in coincidence with each of said groups of field-frequency pulses and having a peak amplitude with a duration of less than the interval between adjacent ones of said line-frequency pulses and at a time in the vicinity of a line-frequency pulse of one of said fields; a circuit coupled to said supply circuit for supplying pulse signals substantially synchronous with said line-frequency pulses; a transformer circuit jointly responsive to said developed pulse signals and said developed coincidence signal for combining said last-mentioned signals to develop resultant signals; and a peak detector coupled to said transformer circuit for deriving from said resultant signals a control effect representative of the time relation of said line-frequency pulses and said groups of field-frequency pulses thereby to identify each field.

2. In an odd-line interlaced television system, a field-identification system comprising: a circuit for supplying a composite television signal including line-frequency pulses and groups of field-frequency pulses, said groups of field-frequency pulses having one time relationship with respect to said line-frequency pulses during one group of fields and another time relationship during interlaced fields; signal-generating apparatus coupled to said supply circuit and including circuit elements so proportioned as to develop a signal substantially in coincidence with each of said groups of field-frequency pulses and having a peak amplitude with a duration of less than the interval between adjacent ones of said line-frequency pulses and at a time in the vicinity of a line-frequency pulse of one of said fields; means coupled to said supply circuit for developing pulse signals substantially synchronous with said line-frequency pulses; and a control system jointly responsive to said developed pulse signals and said developed coincidence signal for developing a control effect representative of the time relationship of said line-frequency pulses and said groups of field-frequency pulses, thereby to identify each field.

3. In an odd-line interlaced television system, a field-identification system comprising: a circuit for supplying a composite television signal including line-frequency pulses and groups of field-frequency pulses, said groups of field-frequency pulses having one time relationship with respect to said line-frequency pulses during one group of fields and another time relationship during interlaced fields; signal-generating apparatus coupled to said supply circuit and including circuit elements so proportioned as to develop a signal substantially in coincidence with each of said groups of field-frequency pulses and having a peak amplitude with a duration of less than the interval between adjacent ones of said line-frequency pulses and substantially in coincidence with a line-frequency pulse of one of said fields; means coupled to said supply circuit for developing pulse signals substantially synchronous with said line-frequency pulses; and a control system jointly responsive to said developed pulse signals and said developed coincidence signal for developing a control effect representative of the time relationship of said line-frequency pulses and said groups of field-frequency pulses, thereby to identify each field.

4. In an odd-line interlaced television system, a field-identification system comprising: a circuit for supplying a composite television signal including line-frequency pulses and groups of field-frequency pulses, said groups of field-frequency pulses having one time relationship with respect to said line-frequency pulses during one group of fields and another time relationship during interlaced fields; signal-generating apparatus coupled to said supply circuit and including circuit elements so proportioned as to develop a signal substantially in coincidence with each of said groups of field-frequency pulses and having a peak amplitude with a duration of less than the interval between adjacent ones of said line-frequency pulses and substantially in coincidence with the initial line-frequency pulse of one of said fields; means coupled to said supply circuit for developing pulse signals substantially synchronous with said line-frequency pulses; and a control system jointly responsive to said developed pulse signals and said developed coincidence signal for developing a control effect representative of the time relationship of said line-frequency pulses and said groups of field-frequency pulses, thereby to identify each field.

5. In an odd-line interlaced television system, a field-identification system comprising: a circuit for supplying a composite television signal including line-frequency pulses and groups of field-frequency pulses, said groups of field-frequency pulses having one time relationship with respect to said line-frequency pulses during one group of fields and another time relationship during interlaced fields; signal-generating apparatus coupled to said supply circuit and responsive to said field-frequency pulses and including circuit elements so proportioned as to develop a signal substantially in coincidence with each of said groups of field-frequency pulses and having a peak amplitude with a duration of less than the interval between adjacent ones of said line-frequency pulses and at a time in the vicinity of a line-frequency pulse of one of said fields; means coupled to said supply circuit for developing pulse signals substantially synchronous with said line-frequency pulses; and a control system jointly responsive to said developed pulse signals and said developed coincidence signal for developing a control effect representative of the time relationship of said line-frequency pulses and said groups of field-frequency pulses, thereby to identify scanning fields.

6. In an odd-line interlaced television system, a field-identification system comprising: a circuit for supplying a composite television signal including line-frequency pulses and groups of field-frequency pulses, said groups of field-frequency pulses having one time relationship with respect to said line-frequency pulses during one group of fields and another time relationship during interlaced fields; signal-generating apparatus coupled to said supply circuit and including a resonant circuit excited by said field-frequency pulses and including circuit elements so proportioned as to develop a signal substantially in coincidence with each of said groups of field-frequency pulses and having a peak amplitude with a duration of less than the interval between adjacent ones of said line-frequency pulses and at a time in the vicinity of a line-frequency pulse of one of said fields; means coupled to said supply circuit for developing pulse signals substantially synchronous with said line-frequency pulses; and a control system jointly responsive to said developed pulse signals and said developed coincidence signal for developing a control effect representative of the time relationship of said line-frequency pulses and said groups of field-frequency pulses, thereby to identify each field.

7. In an odd-line interlaced television system, a field-identification system comprising: a circuit for supplying a composite television signal including line-frequency pulses and groups of field-frequency pulses, said groups of field-frequency pulses having one time relationship with respect to said line-frequency pulses during one group of fields and another time relationship during interlaced fields; signal-generating apparatus coupled to said supply circuit and including a damped resonant circuit shock-excited by said field-frequency pulses and including circuit elements so proportioned as to develop a damped sinusoidal signal substantially in coincidence with each of said groups of field-frequency pulses and having a peak amplitude with a duration of less than the interval between adjacent ones of said line-frequency pulses and at a time in the vicinity of a line-frequency pulse of one of said fields; means coupled to said supply circuit for developing pulse signals substantially synchronous with said line-frequency pulses; and a control system jointly responsive to said developed pulse signals and said developed coincidence signal for developing a control effect representative of the time relationship of said line-frequency pulses and said groups of field-frequency pulses, thereby to identify each field.

8. In an odd-line interlaced television system, a field-identification system comprising: a circuit for supplying a composite television signal including line-frequency pulses and groups of field-frequency pulses, said groups of field-frequency pulses having one time relationship with respect to said line-frequency pulses during one group of fields and another time relationship during interlaced fields; signal-generating apparatus coupled to said supply circuit and including circuit elements so proportioned as to develop a signal substantially in coincidence with each of said groups of field-frequency pulses and having a frequency of substantially one-half the frequency of said line-frequency pulses and a peak amplitude with a duration of less than the interval between adjacent ones of said line-frequency pulses and at a time in the vicinity of a line-frequency pulse of one of said fields; means coupled to said supply circuit for developing pulse signals substantially synchronous with said line-frequency pulses; and a control system jointly responsive to said developed pulse signals and said developed coincidence signal for developing a control effect representative of the time relationship of said line-frequency pulses and said groups of field-frequency pulses, thereby to identify scanning fields.

9. In an odd-line interlaced television system, a field-identification system comprising: a circuit for supplying a composite television signal including line-frequency pulses and groups of field-frequency pulses, said groups of field-frequency pulses having one time relationship with respect to said line-frequency pulses during one group of fields and another time relationship during interlaced fields; signal-generating apparatus coupled to said supply circuit and including circuit elements so proportioned as to develop a signal substantially in coincidence with each of said groups of field-frequency pulses and having a peak amplitude with a duration of less than the interval between adjacent ones of said line-frequency pulses and at a time in the vicinity of a line-frequency pulse of one of said fields; a line-frequency signal separator coupled to said supply circuit for developing pulse signals substantially synchronous with said line-frequency pulses; and a control system jointly responsive to said developed pulse signals and said developed coincidence signal for developing a control effect representative of the time relationship of said line-frequency pulses and groups of field-frequency pulses, thereby to identify each field.

10. In an odd-line interlaced television system, a field-identification system comprising: a circuit for supplying a composite television signal including line-frequency pulses and groups of field-frequency pulses, said groups of field-frequency pulses having one time relationship with respect to said line-frequency pulses during one group of fields and another time relationship during interlaced fields; signal-generating apparatus coupled to said supply circuit and including circuit elements so proportioned as to develop a signal substantially in coincidence with each of said groups of field-frequency pulses and having a peak amplitude with a duration of less than the interval between adjacent ones of said line-frequency pulses and at a time in the vicinity of a line-frequency pulse of one of said fields; means coupled to said supply circuit for developing pulse signals substantially synchronous with said line-frequency pulses; and a control system jointly responsive to said developed pulse signals and said developed coincidence signal and including a detector for deriving from said last-mentioned signals a control effect representative of the time relationship of said line-frequency pulses and said groups of field-frequency pulses, thereby to identify scanning fields.

11. In an odd-line interlaced television system, a field-identification system comprising: a circuit for supplying a composite television signal including line-frequency pulses and groups of field-frequency pulses, said groups of field-frequency pulses having one time relationship with respect to said line-frequency pulses during one group of fields and another time relationship during interlaced fields; signal-generating apparatus coupled to said supply circuit and including a field-frequency pulse selector and a resonant circuit and including circuit elements so proportioned as to develop a signal substantially in coincidence with each of said groups of field-frequency pulses and having a peak amplitude with a duration of less than the interval between adjacent ones of said line-frequency pulses and at a time in the vicinity of a line-frequency pulse of one of said fields; means coupled to said supply circuit for developing pulse signals substantially synchronous with said line-frequency pulses; and a control system jointly responsive to said developed pulse signals and said developed coincidence signal, including a circuit for combining said last-mentioned signals and a detector for deriving a control effect therefrom representative of the time relationship of said line-frequency pulses and said groups of field-frequency pulses, thereby to identify each field.

12. In an odd-line interlaced television system, a field-identification system comprising: a circuit for supplying a composite television signal including line-frequency pulses and groups of field-frequency pulses, said groups of field-frequency pulses having one time relation with respect to said line-frequency pulses during one group of fields and another time relation during interlaced fields, a signal-selector device for selecting signals representative of said groups of field-frequency pulses and for translating said selected signals; signal-generating apparatus coupled to said signal-selector device and including circuit elements so proportioned as to develop a signal substantially in coincidence with each of said groups of field-frequency pulses and having a peak amplitude with a duration of less than the interval between adjacent ones of said line-frequency pulses and at a time in the vicinity of a line-frequency pulse of one of said fields; means coupled to said supply circuit for developing pulse signals substantially synchronous with said line-frequency pulses; and a control system jointly responsive to said developed pulse signals and said developed coincidence signal for developing a control effect representative of the time relation of said line-frequency pulses and said groups of field-frequency pulses thereby to identify each field.

13. In an odd-line interlaced television system, a field-identification system comprising: a circuit for supplying a composite television signal including line-frequency pulses and groups of field-frequency pulses, said groups of field-frequency pulses having one time relation with respect to said line-frequency pulses during one group of fields and another time relation during interlaced fields; a signal-selector device for selecting signals representative of said groups of field-frequency pulses and for translating said selected signals; a tuned circuit coupled to said signal-selector device having a resonant frequency corresponding substantially to one-half the frequency of said line-frequency pulses excited by said selected signals to develop an output signal substantially in coincidence with each of said groups of field-frequency pulses and having a peak amplitude with a duration of less than the interval between adjacent ones of said line-frequency pulses and at a time in the vicinity of a line-frequency pulse of one of said fields; means coupled to said supply circuit for developing pulse signals substantially synchronous with said line-frequency pulses; and a control system jointly responsive to said developed pulse signals and said developed output signal for developing a control effect representative of the time relation of said line-frequency pulses and said groups of field-frequency pulses thereby to identify each field.

14. In an odd-line interlaced television system, a field-identification system comprising: a circuit for supplying a composite television signal including line-frequency pulses and groups of field-frequency pulses, said groups of field-frequency pulses having one time relation with respect to said line-frequency pulses during one group of fields and another time relation during interlaced fields; a signal-selector device including series-connected differentiating and integrating circuits for selecting signals representative of said groups of field-frequency pulses and for translating said selected signals; a tuned circuit coupled to said signal-selector device having a resonant frequency corresponding substantially to one-half the frequency of said line-frequency pulses excited by said selected signals to develop an output signal substantially in coincidence with each of said groups of field-frequency pulses and having a peak amplitude with a duration of less than the interval between adjacent ones of said line-frequency pulses and at a time in the vicinity of a line-frequency pulse of one of said fields; means coupled to said supply circuit for developing pulse signals substantially synchronous with said line-frequency pulses; and a control system jointly responsive to said developed pulse signals and said developed output signal for developing a control effect representative of the time relation of said line-frequency pulses and said groups of field-frequency pulses thereby to identify each field.

15. In an odd-line interlaced television system, a field-identification system comprising: a circuit for supplying a composite television signal including line-frequency pulses and groups of field-frequency pulses, said groups of field-frequency pulses having one time relation with respect to said line-frequency pulses during one group of fields and another time relation during interlaced fields; a signal-selector device for selecting signals representative of said groups of field-frequency pulses and for translating said selected signals; a damped tuned circuit coupled to said signal-selector device having a resonant frequency corresponding substantially to one-half the frequency of said line-frequency pulses shock-excited by said selected signals to develop a damped sinusoidal output signal substantially in coincidence with each of said groups of field-frequency pulses and having a peak amplitude with a duration of less than the interval between adjacent ones of said line-frequency pulses and at a time in the vicinity of a line-frequency pulse of one of said fields; means coupled to said supply circuit for developing pulse signals substantially synchronous with said line-frequency pulses; and a control system jointly responsive to said developed pulse signals and said developed output signal for developing a control effect representative of the time relation of said line-frequency pulses and groups of field-frequency pulses thereby to identify each field.

16. In an odd-line interlaced television system, a field-identification system comprising: a circuit for supplying a composite television signal including line-frequency pulses and groups of field-frequency pulses, said groups of field-frequency pulses having one time relationship with respect to said line-frequency pulses during one group of fields and another time relationship during interlaced fields; signal-generating apparatus coupled to said supply circuit and including circuit elements so proportioned as to develop a signal substantially in coincidence with each of said groups of field-frequency pulses and having a peak amplitude with a duration of less than the interval between adjacent ones of said line-frequency pulses and at a time in the vicinity of a line-frequency pulse of one of said fields; means coupled to said supply circuit for developing pulse signals substantially synchronous with said line-frequency pulses and responsive to said coincidence signal for combining said pulse signals and said coincidence signals to develop resultant signals; and a control circuit responsive to said resultant signal for deriving therefrom a control effect representative of the time relationship of said line-frequency pulses and said groups of field-frequency pulses, thereby to identify each field.

17. In an odd-line interlaced television system, a field-identification system comprising: a circuit for supplying a composite television signal including line-frequency pulses and groups of field-frequency pulses, said groups of field-frequency pulses having one time relation with respect to said line-frequency pulses during one group of fields and another time relation during interlaced fields; signal-generating apparatus coupled to said supply circuit and including circuit elements so proportioned as to develop a signal substantially in coincidence with each of said groups of field-frequency pulses and having a peak amplitude with a duration of less than the interval between adjacent ones of said line-frequency pulses and at a time in the vicinity of a line-frequency pulse of one of said fields; a circuit coupled to said supply circuit for supplying pulse signals substantially synchronous with said line-frequency pulses; a signal-combining circuit jointly responsive to said developed pulse signals and said developed coincidence signal for combining said last-mentioned signals to develop resultant signals; and a control circuit coupled to said signal-combining circuit for deriving from said resultant signals a control effect representative of the time relation of said line-frequency pulses and said groups of field-frequency pulses thereby to identify each field.

18. In an odd-line interlaced television system, a field-identification system comprising: a circuit for supplying a composite television signal including line-frequency pulses and groups of field-frequency pulses, said groups of field-frequency pulses having one time relation with respect to said line-frequency pulses during one group of fields and another time relation during interlaced fields; signal-generating apparatus coupled to said supply circuit and including circuit elements so proportioned as to develop a signal substantially in coincidence with each of said groups of field-frequency pulses and having a peak amplitude with a duration of less than the interval between adjacent ones of said line-frequency pulses and at a time in the vicinity of a line-frequency pulse of one of said fields; a circuit coupled to said supply circuit for supplying pulse signals substantially synchronous with said line-frequency pulses; a signal-combining circuit including a transformer winding jointly responsive to said developed pulse signals and said developed coincidence signal for combining said last-mentioned signals to develop resultant signals; and a control circuit coupled to said signal-combining circuit for deriving from said resultant signals a control effect representative of the time relation of said line-frequency pulses and said groups of field-frequency pulses thereby to identify each field.

19. In an odd-line interlaced television system, a field-identification system comprising: a circuit for supplying a composite television signal including line-frequency pulses and groups of field-frequency pulses, said groups of field-frequency pulses having one time relation with respect to said line-frequency pulses during one group of fields and another time relation during interlaced fields; signal-generating apparatus coupled to said supply circuit and including circuit elements so proportioned as to develop a signal substantially in coincidence with each of said groups of field-frequency pulses and having a peak amplitude with a duration of less than the interval between adjacent ones of said line-frequency pulses and at a time in the vicinity of a line-frequency pulse of one of said fields; a circuit coupled to said supply circuit for supplying pulse signals substantially synchronous with said line-frequency pulses; a signal-combining circuit jointly responsive to said developed pulse signals and said developed coincidence signal for combining said last-mentioned signals to develop resultant signals; and a peak detector coupled to said signal-combining circuit for deriving from said resultant signals a control effect representative of the time relation of said line-frequency pulses and said groups of field-frequency pulses thereby to identify each field.

20. In a color-television receiver for an odd-line interlaced television system for translating a modulated subcarrier wave signal modulated at different phase points by individual color signals, the phase sequence of said modulation signals being changed during each scanning field, a color-signal-deriving system comprising: a circuit for supplying a composite television signal including line-frequency pulses and groups of field-frequency pulses, said groups of field-frequency pulses having one time relationship with respect to said line-frequency pulses during one group of fields and another time relationship during interlaced fields; signal-generating apparatus coupled to said supply circuit and including circuit elements so proportioned as to develop a signal substantially in coincidence with each of said groups of field-frequency pulses and having a peak amplitude with a duration of less than the interval between adjacent ones of said line-frequency pulses and at a time in the vicinity of a line-frequency pulse of one of said fields; means coupled to said supply circuit for developing pulse signals substantially synchronous with said line-frequency pulses; a control system jointly responsive to said developed pulse signals and said developed coincidence signal for developing a control effect representative of the time relationship of said line-frequency pulses and said groups of field-frequency pulses thereby to identify each of said scanning fields; a detector arrangement responsive to said modulated subcarrier wave signal for deriving said color signals therefrom; and means responsive to said control effect for controlling said detector arrangement to derive said color signals in different phase sequences during each field corresponding to said changing phase sequences.

21. In a color-television receiver of an odd-line interlaced television system for translating a modulated subcarrier wave signal modulated at different phase points by individual color signals, the modulation signals having one phase sequence during one group of fields and another phase sequence during another group of fields interlaced with said one group of fields, a color-signal-deriving system comprising: a circuit for supplying a composite television signal including line-frequency pulses and groups of field-frequency pulses representative of said groups of fields, said groups of field-frequency pulses having one time relationship with respect to said line-frequency pulses during said one group of fields and another time relationship during said interlaced fields; signal-generating apparatus coupled to said supply circuit and including circuit elements so proportioned as to develop a signal substantially in coincidence with each of said groups of field-frequency pulses and having a peak amplitude with a duration of less than the interval between adjacent ones of said line-frequency pulses and at a time in the vicinity of a line-frequency pulse of one of said fields; means coupled to said supply circuit for developing pulse signals substantially synchronous with said line-frequency pulses; a control system jointly responsive to said developed pulse signals and said developed coincidence signal for developing a control effect representative of the time relationship of said line-frequency pulses and said groups of field-frequency pulses; a detector arrangement responsive to said modulated subcarrier wave signal for deriving said color signals therefrom; and means responsive to said control effect for controlling said detector arrangement to derive said color signals in said one phase sequence during said one group of fields and in said other phase sequence during said other group of fields.

22. In a color-television receiver of an odd-line interlaced television system for translating a modulated subcarrier wave signal modulated at different phase points by individual color signals, the modulation signals having one phase sequence during one group of scanning lines and another phase sequence during another group of scanning lines interlaced with said one group of scanning lines, a color-signal-deriving system comprising: a circuit for supplying a composite television signal including line-frequency pulses and groups of field-frequency pulses, said groups of field-frequency pulses having one time relationship with respect to said line-frequency pulses during one group of fields having said one group of scanning lines and another time relationship during interlaced fields having said interlaced scanning lines; signal-generating apparatus coupled to said supply circuit and including circuit elements so proportioned as to develop a signal substantially in coincidence with each of said groups of field-frequency pulses and having a peak amplitude with a duration of less than the interval between adjacent ones of said line-frequency pulses and at a time in the vicinity of a line-frequency pulse of one of said fields; means coupled to said supply circuit for developing pulse signals substantially synchronous with said line-frequency pulses; a control system jointly responsive to said developed pulse signals and said developed coincidence signal for developing a control effect representative of the time relationship of said line-frequency pulses and said groups of field-frequency pulses; a detector arrangement responsive to said modulated subcarrier wave signal for deriving said color signals therefrom; and means responsive to said control effect for controlling said detector arrangement to derive said color signals in said one phase sequence during said one group of scanning lines and in said other phase sequence during said other group of scanning lines.

23. In an odd-line interlaced television system, a field-identification system comprising: a circuit for supplying a composite television signal including line-frequency pulses and groups of field-frequency pulses, said groups of field-frequency pulses having one time relation with respect to said line-frequency pulses during one group of fields and another time relation during interlaced fields; a signal-selector device for selecting signals representative of said groups of field-frequency pulses and having leading and trailing edges and for translating said selected signals; a tuned circuit coupled to said signal-selector device having a resonant frequency corresponding substantially to one-half the frequency of said line-frequency pulses excited by said leading and trailing edges of said selected signals to develop an output signal substantially in coincidence with each of said groups of field-frequency pulses and having a peak amplitude with a duration of less than the interval between adjacent ones of said line-frequency pulses and at a time in the vicinity of a line-frequency pulse of one of said fields; means coupled to said supply circuit for developing pulse signals substantially synchronous with said line-frequency pulses; and a control system jointly responsive to said developed pulse signals and said developed output signal for developing a control effect representative of the time relation of said line-frequency pulses and said groups of field-frequency pulses thereby to identify each field.

24. In an odd-line interlaced television system, a field-identification system comprising: a circuit for supplying a composite television signal including line-frequency pulses and groups of field-frequency pulses, said groups of field-frequency pulses having one time relation with respect to said line-frequency pulses during one group of fields and another time relation during interlaced fields; a signal-selector device for selecting signals representative of said groups of field-frequency pulses having leading and trailing edges and for translating said selected signals; a tuned circuit coupled to said signal-selector device having a resonant frequency corresponding substantially to one-half the frequency of said line-frequency pulses shock-excited by said leading and trailing edges of said selected signals to develop an output signal substantially in coincidence with each of said groups of field-frequency pulses and having a peak amplitude with a duration of less than the interval between adjacent ones of said line-frequency pulses and at a time in the vicinity of a line-frequency pulse of one of said fields; means coupled to said supply circuit for developing one group of pulse signals substantially synchronous with said line-frequency pulses; means for supplying another group of pulse signals synchronous with said groups of field-frequency signals and displaced in time with respect thereto; and a control system jointly responsive to said one group and said other group of developed pulse signals and said developed output signal for developing a control effect related to the trailing edge of one of said representative signals and representative of the time relation of said line-frequency pulses and said groups of field-frequency pulses thereby to identify each field.

References Cited in the file of this patent

UNITED STATES PATENTS

| Number | Name | Date |
|---|---|---|
| 2,515,613 | Schoenfeld | July 18, 1950 |
| 2,546,972 | Chatterjea | Apr. 3, 1951 |
| 2,570,775 | De Baun | Oct. 9, 1951 |
| 2,585,929 | Gruen | Feb. 19, 1952 |
| 2,635,140 | Dome | Apr. 14, 1953 |